(12) United States Patent
Knipfer et al.

(10) Patent No.: US 7,716,230 B2
(45) Date of Patent: May 11, 2010

(54) MULTI-DIMENSIONAL SERIAL CONTAINMENT PROCESS

(75) Inventors: Ivory Wellman Knipfer, Rochester, MN (US); Jeffrey George Komatsu, Kasson, MN (US); Jason Scott Lee, Oronoco, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 11/672,340

(22) Filed: Feb. 7, 2007

(65) Prior Publication Data

US 2008/0188974 A1    Aug. 7, 2008

(51) Int. Cl.
*G06F 17/30* (2006.01)
(52) U.S. Cl. .................................... 707/757
(58) Field of Classification Search .............. 707/757
See application file for complete search history.

(56) References Cited

U.S. PATENT DOCUMENTS

| | | | | |
|---|---|---|---|---|
| 4,120,629 A | * | 10/1978 | Christian et al. | 198/341.02 |
| 4,306,292 A | * | 12/1981 | Head, III | 700/100 |
| 5,630,072 A | * | 5/1997 | Dobbins | 705/22 |
| 5,673,194 A | | 9/1997 | Cipelletti et al. | |
| 6,266,436 B1 | | 7/2001 | Bett et al. | |
| 6,301,517 B1 | | 10/2001 | Doran et al. | |
| 6,615,096 B1 | | 9/2003 | Durrant et al. | |
| 6,725,321 B1 | * | 4/2004 | Sinclair et al. | 711/103 |
| 6,985,901 B1 | * | 1/2006 | Sachse et al. | 707/10 |
| 6,988,017 B2 | | 1/2006 | Pasadyn et al. | |
| 7,046,685 B1 | * | 5/2006 | Matsuoka et al. | 370/409 |
| 7,283,918 B2 | * | 10/2007 | Nozuyama | 702/117 |
| 7,395,170 B2 | * | 7/2008 | Scott et al. | 702/118 |
| 7,492,763 B1 | * | 2/2009 | Alexander, Jr. | 370/389 |
| 2004/0220689 A1 | | 11/2004 | Mathur et al. | |
| 2008/0189150 A1 | | 8/2008 | Knipfer et al. | |

* cited by examiner

*Primary Examiner*—Neveen Abel-Jalil
*Assistant Examiner*—Mark Andrew X Radtke
(74) *Attorney, Agent, or Firm*—Yee & Associates, P.C.; Steven L. Bennett

(57) ABSTRACT

A computer implemented method, an apparatus, and computer usable program product for identifying a defective product is provided. A data processing system identifies a product status for products comprising at least one range of serial numbers. The data processing system then narrows the at least one range of serial numbers using a range flattening algorithm. The data processing system then applies a conditional mask algorithm to the at least one range of serial numbers to narrow the at least one range of serial numbers.

14 Claims, 11 Drawing Sheets

| SERIAL MASK PROGRESSION | | | | | | | 400 |
|---|---|---|---|---|---|---|---|
| SEQUENCE | PART NUMBER | PRODUCT | RANGE START | RANGE END | ALGORITHM | GOOD/ BAD (G/B) | CONDITIONAL CHECK |
| 1 | 111 | *ALL | 100 | 400 | NUMERIC | B | |
| 2 | 111 | *ALL | 151 | 151 | NUMERIC | G | |
| 3 | 111 | *ALL | 200 | 300 | NUMERIC | G | PISTON |
| 4 | 111 | *ALL | 500 | 750 | NUMERIC | G | PISTON |
| 5 | 111 | TIGER | 350 | 450 | NUMERIC | B | |

401  402  403  404  405  406  407  408

| EVALUATE RECORD 1: (NEW ENTRY) CREATE BASE RANGES | | | | | | 410 |
|---|---|---|---|---|---|---|
| PART NUMBER | PRODUCT | RANGE START | RANGE END | ALGORITHM | GOOD/ BAD (G/B) | CONDITIONAL CHECK |
| 111 | *ALL | *BEGIN | 99 | NUMERIC | G | |
| 111 | *ALL | 100 | 400 | NUMERIC | B | |
| 111 | *ALL | 401 | *END | NUMERIC | G | |

412, 414, 416

| EVALUATE RECORD 2: (EXISTING ENTRY) SPLIT RANGES | | | | | | 420 |
|---|---|---|---|---|---|---|
| PART NUMBER | PRODUCT | RANGE START | RANGE END | ALGORITHM | GOOD/ BAD (G/B) | CONDITIONAL CHECK |
| 111 | *ALL | *BEGIN | 99 | NUMERIC | G | |
| 111 | *ALL | 100 | 150 | NUMERIC | B | |
| 111 | *ALL | 151 | 151 | NUMERIC | G | |
| 111 | *ALL | 152 | 400 | NUMERIC | B | |
| 111 | *ALL | 401 | *END | NUMERIC | G | |

TO FIG. 4B 

FROM FIG. 4A — A

EVALUATE RECORD 3: (EXISTING ENTRY) SPLIT RANGES — 430

| PART NUMBER | PRODUCT | RANGE START | RANGE END | ALGORITHM | GOOD/BAD (G/B) | CONDITIONAL CHECK |
|---|---|---|---|---|---|---|
| 111 | *ALL | *BEGIN | 99 | NUMERIC | G | |
| 111 | *ALL | 100 | 150 | NUMERIC | B | |
| 111 | *ALL | 151 | 151 | NUMERIC | G | |
| 111 | *ALL | 152 | 199 | NUMERIC | B | |
| 111 | *ALL | 200 | 300 | NUMERIC | G | PISTON |
| 111 | *ALL | 301 | 400 | NUMERIC | B | |
| 111 | *ALL | 401 | *END | NUMERIC | G | |

EVALUATE RECORD 4: (EXISTING ENTRY) SPLIT RANGES — 440

| PART NUMBER | PRODUCT | RANGE START | RANGE END | ALGORITHM | GOOD/BAD (G/B) | CONDITIONAL CHECK |
|---|---|---|---|---|---|---|
| 111 | *ALL | *BEGIN | 99 | NUMERIC | G | |
| 111 | *ALL | 100 | 150 | NUMERIC | B | |
| 111 | *ALL | 151 | 151 | NUMERIC | G | |
| 111 | *ALL | 152 | 199 | NUMERIC | B | |
| 111 | *ALL | 200 | 300 | NUMERIC | G | PISTON |
| 111 | *ALL | 301 | 400 | NUMERIC | B | |
| 111 | *ALL | 401 | 499 | NUMERIC | G | |
| 111 | *ALL | 500 | 750 | NUMERIC | G | PISTON |
| 111 | *ALL | 751 | *END | NUMERIC | G | |

FROM FIG. 4B
B

| EVALUATE RECORD 5: (NEW ENTRY) CREATE BASE RANGES | | | | | | 450 |
|---|---|---|---|---|---|---|
| PART NUMBER | PRODUCT | RANGE START | RANGE END | ALGORITHM | GOOD/ BAD (G/B) | CONDITIONAL CHECK |
| 111 | *ALL | *BEGIN | 99 | NUMERIC | G | |
| 111 | *ALL | 100 | 150 | NUMERIC | B | |
| 111 | *ALL | 151 | 151 | NUMERIC | G | |
| 111 | *ALL | 152 | 199 | NUMERIC | B | |
| 111 | *ALL | 200 | 300 | NUMERIC | G | PISTON |
| 111 | *ALL | 301 | 400 | NUMERIC | B | |
| 111 | *ALL | 401 | 499 | NUMERIC | G | |
| 111 | *ALL | 500 | 750 | NUMERIC | G | PISTON |
| 111 | *ALL | 751 | *END | NUMERIC | G | |
| 111 | TIGER | *BEGIN | 349 | NUMERIC | G | |
| 111 | TIGER | 350 | 450 | NUMERIC | B | |
| 111 | TIGER | 451 | *END | NUMERIC | G | |

451 → (row with TIGER *BEGIN 349)
452 → (row with TIGER 350 450)
453 → (row with TIGER 451 *END)

| CONDITIONAL MASK | | | | | | | | | |
|---|---|---|---|---|---|---|---|---|---|
| RANGE SUBSTRING END VALUE | RANGE LOOKUP LIST | SERIAL ALGORITHM | IS ALPHANUMERIC | IS NUMERIC | GOOD/BAD (G/B) | USER EXIT | USER EXIT RETURN | SUB-CONDITIONAL MAP KEY | |
| | | | | | G | | | | ← 621 |
| | | | | | G | | | | ← 622 |
| | | | | | G | | | | ← 623 |
| | | | | | B | | | | ← 624 |
| | | | | | B | | | | ← 625 |
| | | | | | B | | | | ← 626 |
| ↑ 638 | ↑ 639 | ↑ 640 | ↑ 641 | ↑ 642 | ↑ 643 | ↑ 644 | ↑ 645 | ↑ 646 | |

620

FROM FIG. 6A

600

MULTI-DIMENSIONAL SERIAL CONTAINMENT PROCESS

CROSS-REFERENCE TO RELATED APPLICATION

The present application is related to co-pending and commonly assigned U.S. patent application Ser. No. 11/672,355, filed on Feb. 7, 2007, and entitled "Supply Chain Multi-Dimensional Serial Containment Process", which application is incorporated herein by reference.

BACKGROUND OF THE INVENTION

1. Field of the Invention

The present invention relates generally to a data processing system and, more particularly, to a data processing system for a supply chain. Still yet more particularly, the present invention relates to a computer implemented method, an apparatus, and a computer usable program product for identifying a defective product.

2. Description of the Related Art

Due to outsourcing and globalization, the end products of a growing number of industries include components and assemblies that are built across the globe by multiple suppliers. The situation is particularly applicable in the computer industry where end products may include many thousands of parts assembled by a tiered hierarchy of suppliers.

Problems often arise when defective components pass from one level to another in the supply chain. The situation can sometimes be further exacerbated when the defective component reaches the final system integrator. When a problem with a particular product is discovered, the supplier of that product may provide affected part fallout information in various forms such as a list of serial numbers, which may be sequential or non-sequential, batch or lot information, or a specific portion of a serial number, such as a suspect date code range. The fallout information is provided with a usability indicator which can take the form of unconditional "good" or "bad", or a conditional good or bad for certain uses, such as usability based on maximum clock speed for a defective component.

When a problem occurs with respect to a component and partial information regarding the problem is available, quick containment of the affected product is important. Without timely, robust containment and control of the affected product, defective products will be shipped to customers, thereby driving up warranty costs and directly impacting availability and customer satisfaction.

Several known solutions currently exist to provide containment of affected products. One known solution is to list each and every serial number individually in a control table and block access to the product with a "Yes" or "No" usability flag. However, in this solution, serial numbers are not always consecutive and can result in excessive setup times, thereby resulting in a possible loss of containment. Additionally, this solution requires that a user enter information into a table, and manual table loads are often prone to human error. Furthermore, the present solution does not support partial data conditions, such as a part number with a serial number starting with "01" whose range is within 10000-99999. Additionally, this solution does not support multiple conditions on the same serial number.

Another solution is to list ranges of serial numbers that are all sequential where the serial number ranges are known alphanumeric sequences. However, one issue with this solution is that the solution assumes sequential serial number ranges only and does not accommodate supplier serial number algorithms which may not be sequential. Additionally, nested serial ranges are not intuitive and are not easily implemented. Furthermore, this solution requires the list of defective products to be validated and requires management of lists for good or bad products. Moreover, this solution does not support multiple conditions in the same serial number.

Another solution is manual containment. However, this solution is extremely time consuming and people intensive. Furthermore, customers are directly impacted by any field containment, because shipment of customer orders is delayed until the manual containment is completed. Additionally, customers can also further be impacted by a defective product that potentially ships and reaches the hands of the customer before the manual containment activity is completely implemented. Additionally, simultaneous containment efforts are prone to human error and to miscommunication. Moreover, multiple conditions may be too complex to be easily analyzed manually by a person.

Each of the above solutions only allow for a one-dimensional validation of serial numbers for validation. In other words, the solution does not allows for any other conditions to be applied other than the strict identification of a serial number. Currently, a one-dimensional validation is often not fully satisfactory, and the problem is increasing as more and more products are outsourced on a part by part basis.

BRIEF SUMMARY OF THE INVENTION

A computer implemented method, an apparatus, and computer usable program product for identifying a defective product is provided. A data processing system identifies a product status for products comprising at least one range of serial numbers. The data processing system then narrows the at least one range of serial numbers using a range flattening algorithm. The data processing system then applies a conditional mask algorithm to the at least one range of serial numbers to narrow the at least one range of serial numbers.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A, 4B, and 4C are an example of a flattening algorithm process, in which an illustrative embodiment may be implemented;

FIGS. 6A and 6B are an example of a conditional mask algorithm process, in which an illustrative embodiment may be implemented;

DETAILED DESCRIPTION OF THE INVENTION

Figure 1:
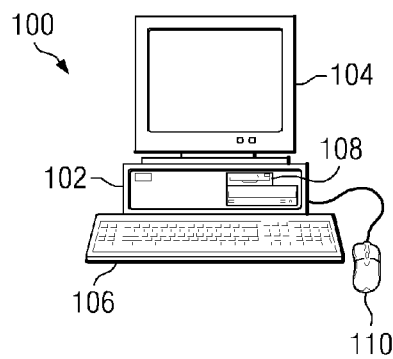
FIG. 1 depicts a data processing system, in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, a touchpad, a touch screen, a trackball, a microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
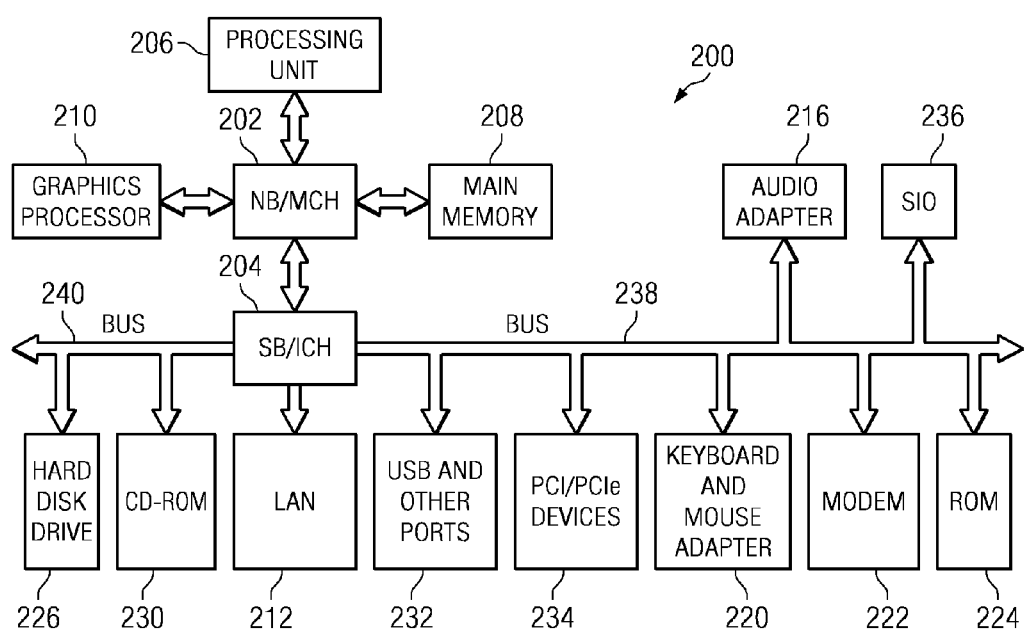
FIG. 2 depicts a block diagram of a data processing system, in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, and universal serial bus (USB), and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. Microsoft® and Windows XP® are trademarks of Microsoft Corporation in the United States, other countries, or both. An object-oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions may be loaded into main memory 208 for execution by processing unit 206. The processes of the illustrative embodiments may be performed by processing unit 206 using computer implemented instructions, which may be located in a memory. An example of a memory is main memory 208, read only memory 224, or memory in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, a laptop computer, or a telephone device.

Other components shown in FIG. 2 can be varied from the illustrative examples shown. For example, a bus system may be comprised of one or more buses, such as a system bus, an I/O bus, and a PCI bus. Of course, the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, an apparatus, and computer usable program code for compiling source code and for executing code. The methods described with respect to the depicted embodiments may be performed in a data processing system, such as data processing system 100 shown in FIG. 1 or data processing system 200 shown in FIG. 2.

A computer implemented method, an apparatus, and computer usable program product for identifying a defective product is provided. A data processing system identifies a product status for products comprising at least one range of serial numbers. The data processing system then narrows the at least one range of serial numbers using a range flattening algorithm. The application of the range flattening algorithm forms a serial mask that identifies a narrowed range of serial numbers. The data processing system can also apply a conditional mask algorithm to the at least one range of serial numbers to narrow the at least one range of serial numbers. The application of the conditional mask algorithm forms conditional mask results. The data processing system then validates the serial mask against the conditional mask results. The data processing system then presents a list of good products and a list of defective products to a user.

The flattening algorithm includes three-phases: (1) creating a base range of serial numbers; (2) splitting at least one range of serial numbers; and (3) merging adjacent ranges of serial numbers. In the phase for creating a base range of serial numbers, the flattening algorithm identifies a beginning serial number and an ending serial number. The flattening algorithm then identifies a beginning range of serial numbers. The beginning range of serial numbers begins with the beginning serial number and ends with a serial number immediately preceding a first serial number in the at least one range of serial numbers. The flattening algorithm then identifies an ending range of serial numbers. The ending range of serial numbers begins with a serial number immediately subsequent to the last serial number in the at least one range of serial numbers. The ending range ends with the ending serial number. The flattening algorithm then inverts the product status for products comprising the beginning range of serial numbers and for products comprising the ending range of serial numbers. A product status is an identification of whether the product is good or defective.

In the phase for splitting at least one range of serial numbers, the flattening algorithm first identifies a serial number in the at least one range of serial numbers to form an identified serial number. The flattening algorithm then identifies a preceding range of serial numbers that precedes the identified serial number. The preceding range of serial numbers ends with the serial number immediately preceding the identified serial number. The flattening algorithm then identifies a subsequent range of serial numbers that are subsequent to the identified serial number. The subsequent range of serial numbers begins with the serial number immediately subsequent to the identified serial number. The flattening algorithm then inverts a product status for products comprising the preceding range of serial numbers and a product status for products comprising the subsequent range of serial numbers.

In the phase for merging adjacent ranges of serial numbers, the at least one range of serial numbers is a plurality of ranges of serial numbers. The flattening algorithm scans the plurality of ranges of serial numbers for an adjacent serial number. In response to identifying an adjacent serial number, the flattening algorithm identifies a product status for products comprising the adjacent serial number. In response to the product status for the products comprising the adjacent serial number being the same, the flattening algorithm combines the ranges of serial numbers that comprise the adjacent serial number.

To apply the conditional mask algorithm, the data processing system identifies at least one conditional mask for the defective product. The data processing system then identifies a portion of the serial number to which to begin applying the at least one conditional mask.

In validating the serial mask against the conditional mask results, the conditional mask results always have priority over the serial mask. A validation engine uses a truth table to compare a product status for products included in the serial mask and the conditional mask results. In response to both the serial mask and the conditional mask results reporting a good product status, the validation engine applies the good product status to the products. In response to both the serial mask and the conditional mask results reporting a defective product status, the validation engine applies the defective product status to the products. In response to the serial mask reporting a different product status from the conditional mask results, the validation engine applies the product status from the conditional mask results to the products.

Figure 3:
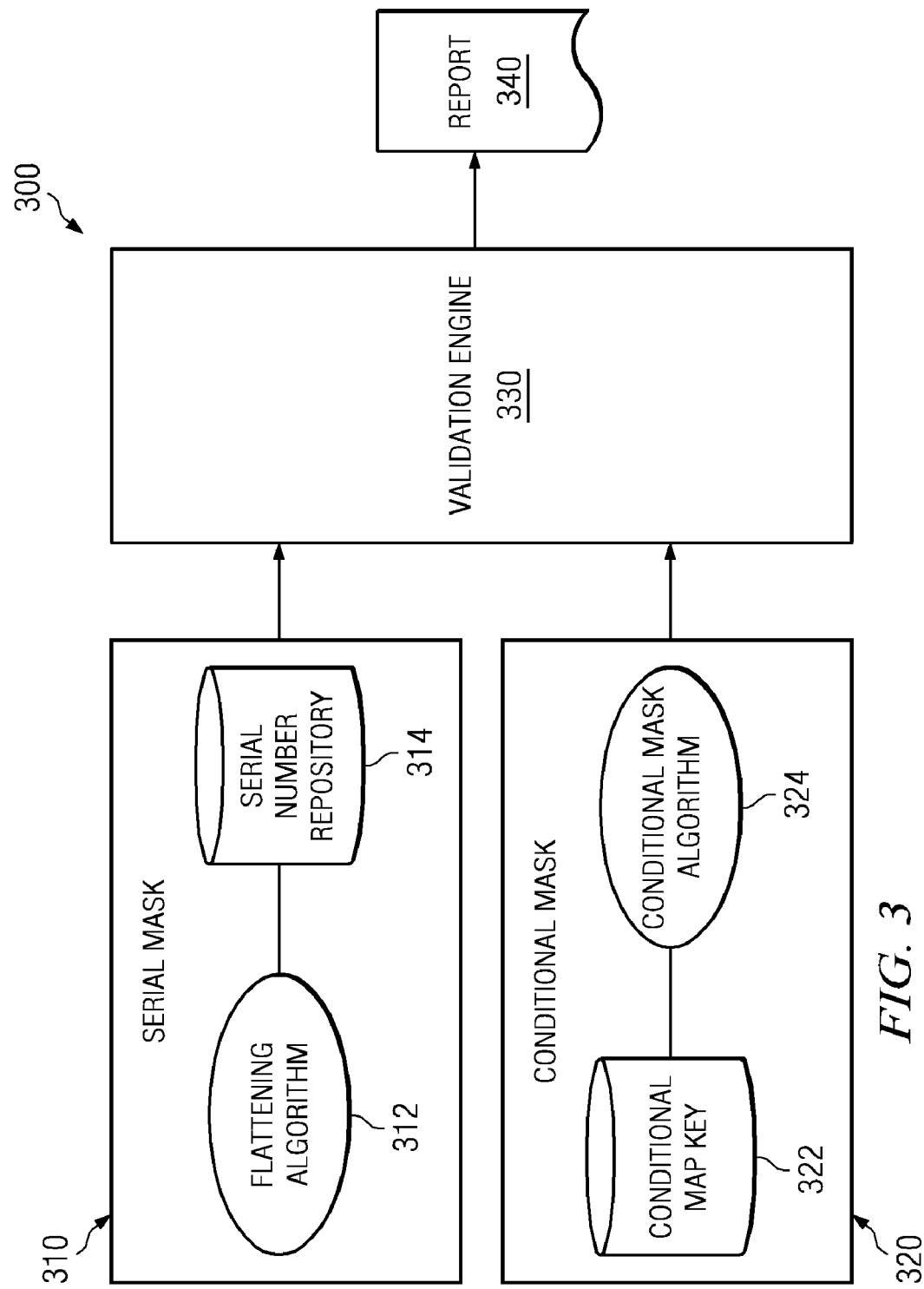
FIG. 3 illustrates a defective product identification system, in accordance with an illustrative embodiment.

FIG. 3 illustrates a defective product identification system, in accordance with an illustrative embodiment. Data processing system 300 is a system for identifying a defective product for a business entity. The business entity is typically a manufacturing environment, but can also be any warehousing or storage environment, or any business entity that receives, manufactures, or supplies goods to another business entity.

Data processing system 300 can be implemented as computer 100 of FIG. 1 or as data processing system 200 of FIG. 2. Data processing system 300 includes serial mask 310, conditional mask 320, validation engine 330, and report 340. In the illustrative embodiment, the components within data processing system 300 are a software only embodiment. However, in alternative embodiments, the components can be a hardware only embodiment or a combination of software and hardware embodiments.

Serial mask 310 identifies a range of serial numbers for a good product and a range of serial numbers for a defective product. A mask is a comparison between two things, and, in the illustrative embodiment, serial mask 310 is a comparison between two ranges of serial numbers. In the illustrative embodiment, a range of serial numbers can be a single serial number or a plurality of serial numbers. Typically, if the range of serial numbers is a plurality of serial numbers, then the range of serial numbers is a group of consecutive serial numbers.

A serial number is a string of characters that provides specific identification information for a particular product. The string of characters can be any combination of letters, numbers, or symbols. For example, a serial number can include, but is not limited to, a manufacturing date, a manufacturing time, the identification number of the equipment that processed the product, or the expiration date for the product. In quality control circumstances, a serial number is used to sort and identify a product, and, in particular, to isolate and contain a defective product.

In the illustrative embodiments, a defective product is a product that does not meet a quality standard and is outside the tolerable specification limits for the quality standard. A product can be defective for a number of reasons, including but not limited to situations when the product is missing components, includes too much of a single ingredient, includes the wrong ingredient, is mislabeled, or is dimensioned incorrectly.

Serial mask 310 includes flattening algorithm 312 and serial number repository 314. Serial mask 310 uses flattening algorithm 312 to identify and sort good product from defective products. Flattening algorithm 312 is a sequential series of instructions that narrows and specifically quantifies which product is defective. In the illustrative embodiments, to flatten means to narrow or to make a range smaller. Flattening algorithm 312 can be executed in a processing unit, similar to processing unit 206 of FIG. 2.

Serial number repository 314 connects to flattening algorithm 312 and is a data element which lists the serial numbers for all products produced and used by a particular business entity. When a suspect product is identified, serial number repository 314 includes a representative list of good and potentially defective products. A suspect product is a product which is potentially defective. Serial number repository 314 can be implemented using the main memory of data processing system 300, similar to main memory 208 of FIG. 2, or using the hard disk drive of data processing system 300, similar to hard disk drive 226 of FIG. 2. Serial number repository 314 can list data in any number of forms, including but not limited to a table, a flat file, an Extensible Markup Language (XML) file, a relational database management system, or any combination thereof. In the illustrative embodiment, serial number repository 314 lists data in a table.

Conditional mask 320 provides the capability to identify serial numbers that are business entity specific. In general, serial numbers vary widely from business entity to business entity, with each business entity using a different combination of letters and numbers to define a different attribute of a product. Conditional mask 320 accommodates the variations in serial numbers so that the identification of a particular lot or group of products can be easily identified.

Conditional mask 320 includes conditional map key 322 and conditional mask algorithm 324. Conditional map key 322 is name tag that relates to a specific serial mask identified in serial mask 310. The name tag correlates to a set of instructions to be executed against the specified serial mask. Conditional map key 322 is a data element and includes a library or listing of map keys or name tags. Conditional map key 322 can be implemented using the main memory of data processing system 300, similar to main memory 208 of FIG. 2, or using the hard disk drive of data processing system 300, similar to hard disk drive 226 of FIG. 2. Conditional map key 322 can list data in any number of forms, including but not limited to a table, a flat file, an Extensible Markup Language (XML) file, a relational database management system, or any combination thereof. In the illustrative embodiment, conditional map key 322 maintains a list of map keys in a table.

Conditional mask algorithm 324 connects to conditional map key 322 and is a sequential series of instructions used to narrow a range of serial numbers using a business entity specific serial number. Conditional mask algorithm 324 can be implemented in a processing unit, similar to processing unit 206 of FIG. 2.

Validation engine 330 is connected to serial mask 310 and conditional mask 320. Validation engine 330 can be executed in a processing unit, similar to processing unit 206 of FIG. 2. Validation engine 330 compares the data processed by serial mask 310 to the data processed by conditional mask 320. In comparing the data, validation engine 330 determines whether a discrepancy exists between the data from serial mask 310 and the data from conditional mask 320. Specifically, validation engine 330 determines whether there is a conflict between the ranges of serial numbers which are considered good products and defective products. In the illustrative embodiment, the conclusions drawn from conditional mask 320 take priority over the determinations made by serial mask 310. In other words, if conditional mask 320 identifies a particular product in a range of serial numbers as defective while serial mask 310 identifies the product in the same range of serial numbers as good, then validation engine 330 will use the determination of conditional mask 320 and identify the product in the range of serial numbers as defective. Validation engine 330 applies the same logic to a product which conditional mask 320 considers good when serial mask 310 considers the product defective.

Report 340 is a summary of the results from the analysis performed by validation engine 330. Validation engine 330 creates report 340 and transmits report 340 to a user interface to be presented to a user. Report 340 can include a variety of information, including but not limited to a list of serial numbers of defective products, a list of serial numbers of good products, the location of the defective and good products, and the suppliers of the defective and good products. Report 340 can be presented in a variety of forms, including but not limited to a table, a database, or a text document.

The illustrative embodiments are not limited to the illustrative examples. For example, data processing system 300, serial mask 310, and conditional mask 320 may include more or fewer components.

FIGS. 4A, 4B, and 4C are an example of a flattening algorithm process, in which an illustrative embodiment may be implemented. The illustrative example can be found in a data element, such as serial number repository 314 of FIG. 3, and created using a flattening algorithm, similar to flattening algorithm 312 of FIG. 3. The illustrative example includes table 400, table 410, table 420, table 430, table 440, and table 450.

Table 400 is a list of entries input by a user into a defective product identification system, such as data processing system 300 of FIG. 3. The user is any individual, business entity, or data processing system that manages the defective product identification system. A user will typically enter entries into table 400 as information regarding good and defective products is determined. Thus, each row of table 400 is a new set of data or information which further narrows and identifies the affected product or the product that is defective.

In the illustrative embodiment, table 400 includes sequence column 401, part number column 402, product column 403, range start column 404, range end column 404, algorithm 406, good/bad (G/B) column 407, and conditional check column 408. Sequence column 401 is the order in which entries are entered into table 400. Thus, the information listed in the sequence "1" is the first set of information entered, and the data for sequence "2" is the second set, and so on. In use, the information in sequence "1" is typically the first set of information received when a quality issue initially arises. Each subsequent set of information is further information received by the user. In the illustrative embodiment, five sets of data were entered by a user.

Part number column 402 is a list of the number of the part that is defective or has a quality issue. In the illustrative embodiment, the only part number listed is part number "111". However, in other embodiments, part numbers may be a longer or shorter series of numbers, letters, symbols, or any combination thereof.

Product column 403 is the name of the product that includes the defective part or is affected by the defective part listed in part number column 402. Product column 403 can be any assembly or good which includes the defective part listed in part number 402. The defective part can be physically coupled to the product, can be incorporated or mixed into the product, or can be part of a loose set of parts that are combined in a container. In the first four rows, "*ALL" products are affected by part number "111". In the fifth row, the "Tiger" product is the specific product identified to include the defective part.

Range start column 404 is the first serial number in a range of serial numbers for each row of entries. Range end column 405 includes the last serial number in a range of serial numbers for each row of entries. Thus, in use, the numbers entered into range start column 404 and range end column 405 are the set of serial numbers affected by the defective part number listed in part number column 402. In the illustrative embodiment, sequence "1" includes a range start of "100" and a range end of "400"; sequence "2" has a range start and range end of "151"; sequence "3" has a range start of "200" and a range end of "300"; sequence "4" has a range start of "500" and a range end of "750"; and sequence "5" has a range start of "350" and a range end of "450".

Algorithm column 406 is the type of numerical algorithm used by a specific supplier to identify the numbers in range start column 404 and range end column 405. In the illustrative embodiment, the "numeric" algorithm is listed in algorithm column 406. The "numeric" algorithm is a standard progression of numbers typically used to count different things. Other example types of algorithms include a base octal algorithm, a hexadecimal algorithm, or a binary algorithm. The identification of the type of algorithm used in identifying the range start number and the range end number allows for the accurate identification of good and defective products.

Good/bad (G/B) column 407 identifies the product status of a product. The product status of a product identifies whether the product is good or defective. If the product listed in range start column 404 and range end column 405 is "good", then a "G" is entered into G/B column 407. On the other hand, if the product listed in range start column 404 and range end column 405 is "defective", then a "B" for bad is entered into G/B column 407. In the illustrative embodiments, sequences "1" and "5" have a "B" indicator, and sequences "2", "3", and "4" have a "G" indicator.

Conditional check column 408 lists any conditional masks that are associated with the particular entry. In the illustrative embodiment, sequences "3" and "4" indicate the existence of a conditional mask named "Piston". The "Piston" conditional mask is a business entity specific serial number defined in the defective product identification system.

Tables 410 through 450 illustrate the progression of a serial mask and the application of a flattening algorithm. The flattening algorithm is a three-phase process: (1) create a base range; (2) split ranges; and (3) merge adjacent ranges. The split ranges and merge adjacent ranges phases are optional depending on the type of information entered into table 400. The split ranges and merge adjacent ranges phases can also occur in any order, and may occur multiple times in the entire process of flattening or narrowing the range of serial numbers.

In the phase to create a base range of serial numbers, the flattening algorithm creates the initial set of serial numbers to which the flattening algorithm is applied. Essentially, the base range is a list of all possible products that include a particular part number. In the illustrative embodiment, the flattening algorithm uses sequence "1" as the initial reference point for creating the base range of serial numbers. Thus, sequence "1" is entered into table 410 as line 414. Therefore, based on sequence "1", the base range should be a list of "*ALL" the products that include part number "111".

To begin creating the base range, the flattening algorithm first determines the beginning range for the base range. The beginning range is the range of serial numbers preceding the range of serial numbers identified in sequence "1". To identify the beginning range, the flattening algorithm identifies the serial number of the first product in the range of serial numbers. The first serial number can be established by the user, be a default value, or be extracted from another storage device to which the defective product identification system connects. In the illustrative embodiment, the range start value is the word "*BEGIN", but in other embodiments, the range start value can be an actual number.

The flattening algorithm then identifies the range end value or the last serial number of the beginning range. To identify the range end value, the flattening algorithm subtracts one from the range start value of sequence "1". Thus, in the illustrative embodiment, the flattening algorithm subtracts one from "100" to establish the range end value of the beginning range, as shown in line 412 of table 410.

After determining the beginning range, the flattening algorithm determines a product status for the product included in the beginning range. The product status is the opposite or the inverted value listed in the "G/B" column of table 410 for sequence "1" listed in line 414. Thus, in the illustrative embodiment, the beginning range is listed as "G" since line 414 indicates that sequence "1" is identified as "B".

A similar process is used to identify the ending range of the base range of serial numbers, as shown in line 416 of Table 410. Like the range start value of the beginning range, the range end value is established by the user, is a default value, or is a value stored in another storage device. In the illustrative embodiment, the range end value is "*END". The range start value is determined by adding one to the range end value for sequence "1". Thus, in the illustrative embodiment, one is added to the "400" to form the number "401".

In the split ranges phase, the flattening algorithm splits the base range into smaller ranges of serial numbers. The flattening algorithm executes the split range phase when a subsequent range entry has a range start that falls within the range of serial numbers identified in a preceding sequence, and the subsequent range entry has a product status which is the opposite of the product status listed in the preceding sequence. For example, sequence "2" indicates a range start serial number of "151" that has a product status of "G". Serial number "151" falls within the preceding range of serial numbers listed in sequence "1" of Table 400. Additionally, sequence "2" has a product status of "G", which is opposite the product status of "B" for sequence "1". As a result, in the illustrative embodiment, the flattening algorithm proceeds to execute the split ranges phase.

In the illustrative embodiment, tables 420 through 450 are each a flattened serial mask. A flattened serial mask is a summary of or the result of a comparison using the flattening algorithm. In the illustrative embodiment, the summary of or the result of the comparison is a table.

Table 420 illustrates the result of what happens after the split ranges phase is applied against the base range. In the illustrative embodiment, the beginning and ending base ranges are not affected because the range start value of sequence "2" does not fall within the beginning and ending base ranges. Therefore, lines 412 and 416 of Table 410 are not changed and are just repeated in lines 421 and 425 of table 420.

To split the range in line 414 of table 410, the flattening algorithm subtracts one from the range start value of sequence "2" to form the range end value for the range preceding the sequence "2" and adds one to the range end value of sequence "2" to form the range start value for the range subsequent to sequence "2". The flattening algorithm then inserts sequence "2" into table 420 as line 423 of table 420. The flattening algorithm then establishes the preceding range of serial numbers that precedes line 423 and the subsequent range of serial numbers that is subsequent to line 423. In the illustrative embodiment, the preceding range of serial numbers is shown in line 422 and the subsequent range of serial numbers is shown in line 424. In the illustrative embodiment, the product status for the preceding and subsequent ranges of serial numbers remains the same as reflected in sequence "1" of table 400 and as recorded in line 414 of table 410.

For sequences "3" and "4", the flattening algorithm also employs the split ranges phase to the previous sequences listed in table 400. Table 430 is the result of executing the split ranges phase for sequence "3". Table 440 is the result of executing the split ranges phase for sequence "4".

In the illustrative embodiment, since sequence "5" involves a different product, specifically the "Tiger" product, a new base range needs to be created for the new product. Thus, in the flattening algorithm, any time a new product is introduced into table 400, then the flattening algorithm executes the create base range phase. To create the base range, the same process is used to establish the beginning range and the ending range for sequence "5". The beginning range and ending range for sequence "5" are added as separate entries onto table 440. Lines 451 through 453 of table 450 shows the results of the flattening algorithm executing the create base range phase as applied to sequence "5".

The illustrative embodiment is not limited to the illustrative example. For example, more or fewer entries can be included in table 400. Furthermore, more or fewer columns can be included in tables 400 through 450. Additionally, all possible entry locations in tables 400 through 450 can be used or can remain empty. Moreover, the information in tables 400 through 450 can also be presented in a different format and organized in a different manner.

Figure 5A:
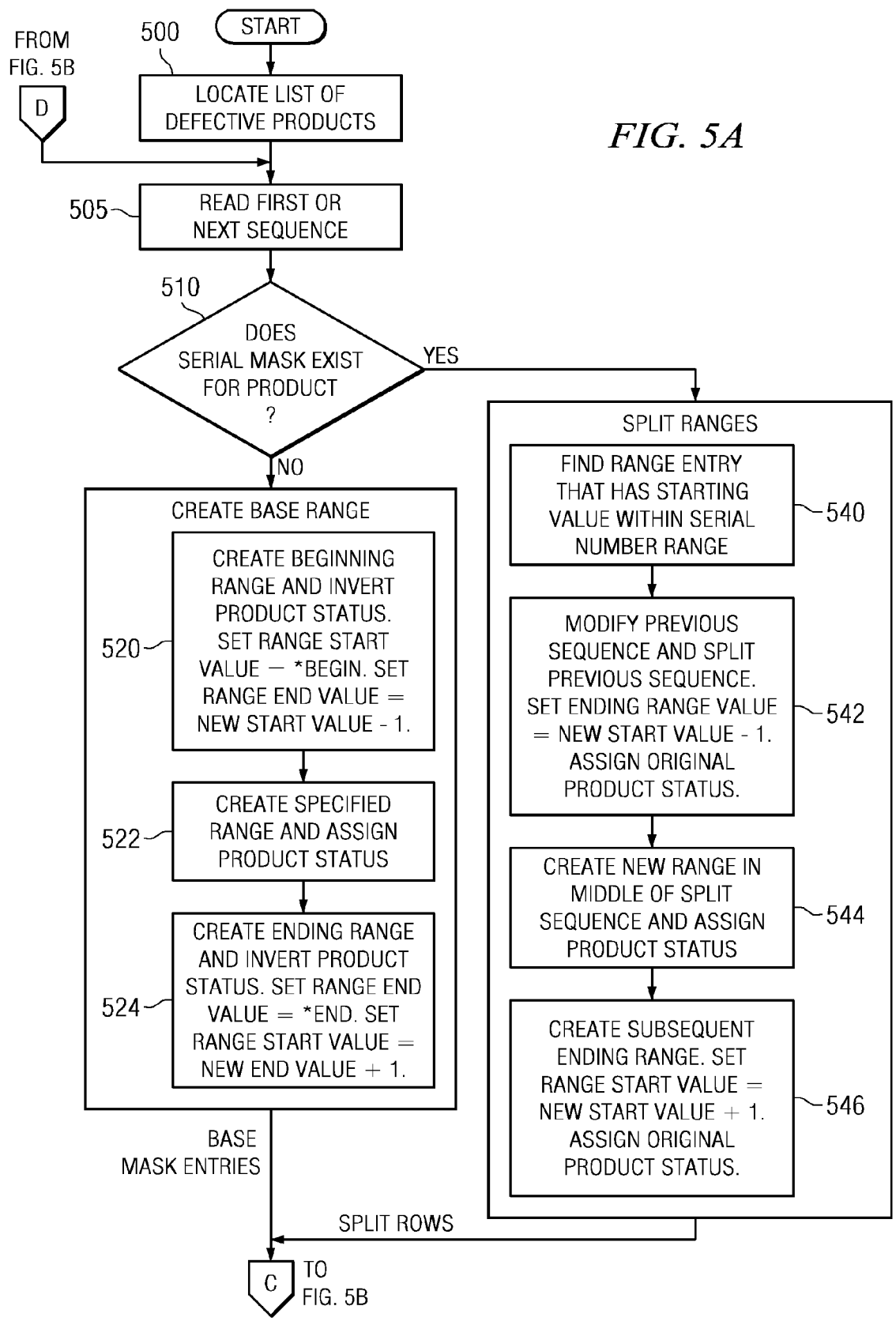
FIGS. 5A and 5B are a flowchart depicting a flattening algorithm process, in which an illustrative embodiment may be implemented.
Figure 5B:
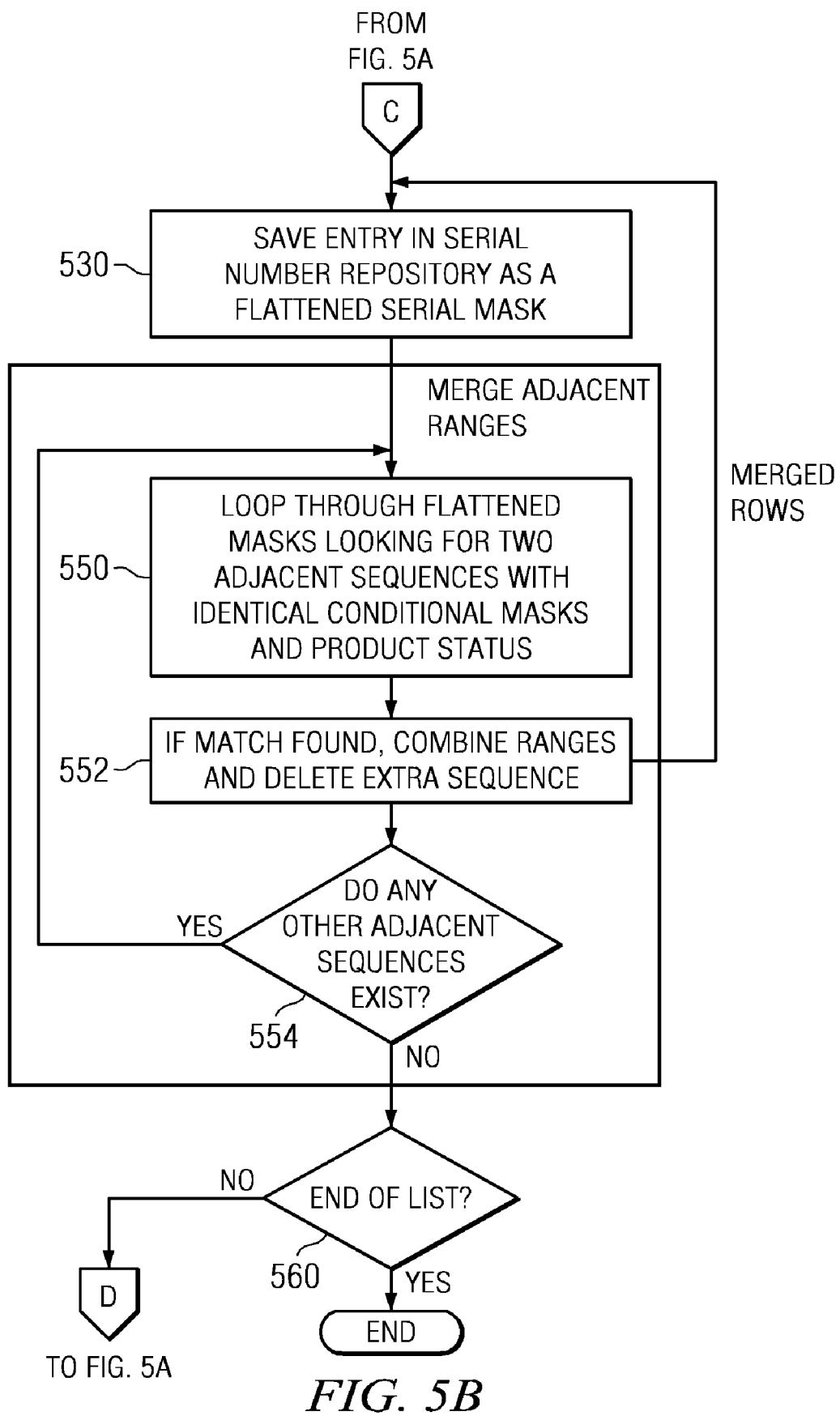

FIGS. 5A and 5B are a flowchart depicting the flattening algorithm process, in which an illustrative embodiment may be implemented. The process can be executed in a flattening algorithm, similar to flattening algorithm 312 of FIG. 3. The following process is exemplary only and the order of the steps may be interchanged without deviating from the scope of the invention.

The process begins with the flattening algorithm locating a list of defective products (step 500). The list is similar to table 400 of FIG. 4A. The flattening algorithm either reads the first or the next sequence in the list of defective products (step 505). If the flattening algorithm is reading the list for the first time, then the flattening algorithm will read the first sequence in the list. If the flattening algorithm is reading the list after the first time, then the flattening algorithm reads the next sequence in the list.

The flattening algorithm then determines whether a serial mask exists for a product with a particular part number (step 510). In other words, the flattening algorithm determines whether the flattening algorithm has already been initiated and a serial mask reflected as one of the tables 420 through 440 of FIGS. 4A and 4B already exists. If a serial mask does not already exist ("no" output to step 510), then the flattening algorithm executes the create base range phase. As shown in step 520, the flattening algorithm begins the process by creating the beginning range (step 520). The flattening algorithm sets the range start value as "*Begin", and then sets the range end value as the range start value of the new sequence minus one. Referring to Table 410 of FIG. 4A, the end range value is the range start value of sequence "1" minus one. The flattening algorithm then determines the product status of the base range as the opposite or inverse value of the product status identified in the new sequence.

The flattening algorithm then creates a specified range for the first sequence and assigns the product status for the new sequence (step 522). As shown in step 524, the flattening algorithm then creates the ending range for the base range. The flattening algorithm sets the range end value as "End", and determines the range start value as the range end value of the new sequence plus one. The flattening algorithm then determines the product status of the ending range as the opposite or inverse value of the product status identified in the new sequence. The flattening algorithm then saves the base ranges in the serial number repository as a flattened serial mask (step 530). In the illustrative embodiment, the flattened serial mask is similar to table 410 of FIG. 4A.

Returning to step 510, if the flattening algorithm determines that a serial mask does exist for a particular product with a particular part number ("yes" output to step 510), then the flattening algorithm proceeds through the split ranges phase. The flattening algorithm finds a serial number in the list of defective products that has a starting value within the range of serial numbers of a previous entry (step 540). As shown in step 542, the flattening algorithm then modifies the previous sequence and splits the previous sequence to form a preceding beginning range. The flattening process maintains the same range start value as the previous sequence as the range start value of the preceding beginning range. The range end value is determined by identifying the range start value of the sequence currently being processed and subtracting one from the range start value. The flattening algorithm then assigns the original product status for the existing sequence for the formed preceding beginning range.

As shown in step 544, the flattening algorithm then creates a new range in the middle of the split sequence. The new range is a sequence that is presently being examined. The flattening algorithm assigns the same product status as recorded in the list of defective products.

As shown in step 546, the flattening algorithm then creates the subsequent ending range. The flattening process maintains the same range end value as the previous sequence. The range start value is the range start value of the current sequence plus one. The flattening process then assigns the original product status to the subsequent ending range. The flattening process then saves the entries into the serial number repository as another flattened serial mask (step 530). Here, the flattened serial mask is similar to tables 410 through tables 440 of FIGS. 4A and 4B.

The flattening process then begins the phase of merging adjacent ranges. The flattening process begins the process by looping through the flattened serial masks looking for two adjacent sequences and with identical conditional masks and product status (step 550). An adjacent sequence is a sequence that has a range of serial numbers that is consecutive to another range of serial numbers in another sequence. If an adjacent sequence match is found, then the flattening process combines the serial number ranges and deletes the extra sequence (step 552). The merged rows are then saved into the serial number repository as a flattened serial mask (step 530).

Returning to step 552, the flattened algorithm then scans through the flattened serial mask to determine whether any other adjacent sequences exist (step 554). If an additional adjacent sequence exists ("yes" output to step 554), then the process repeats with step 550. If no other adjacent sequences exist ("no" output to step 554), then the flattened algorithm determines whether the end of the list has been reached (step 560). If the end of the list has not been reached ("no" output to step 560), the process returns to step 505 to be repeated. If the end of the list has been reached ("yes" output to step 560), then process terminates thereafter.

Figure 6A:
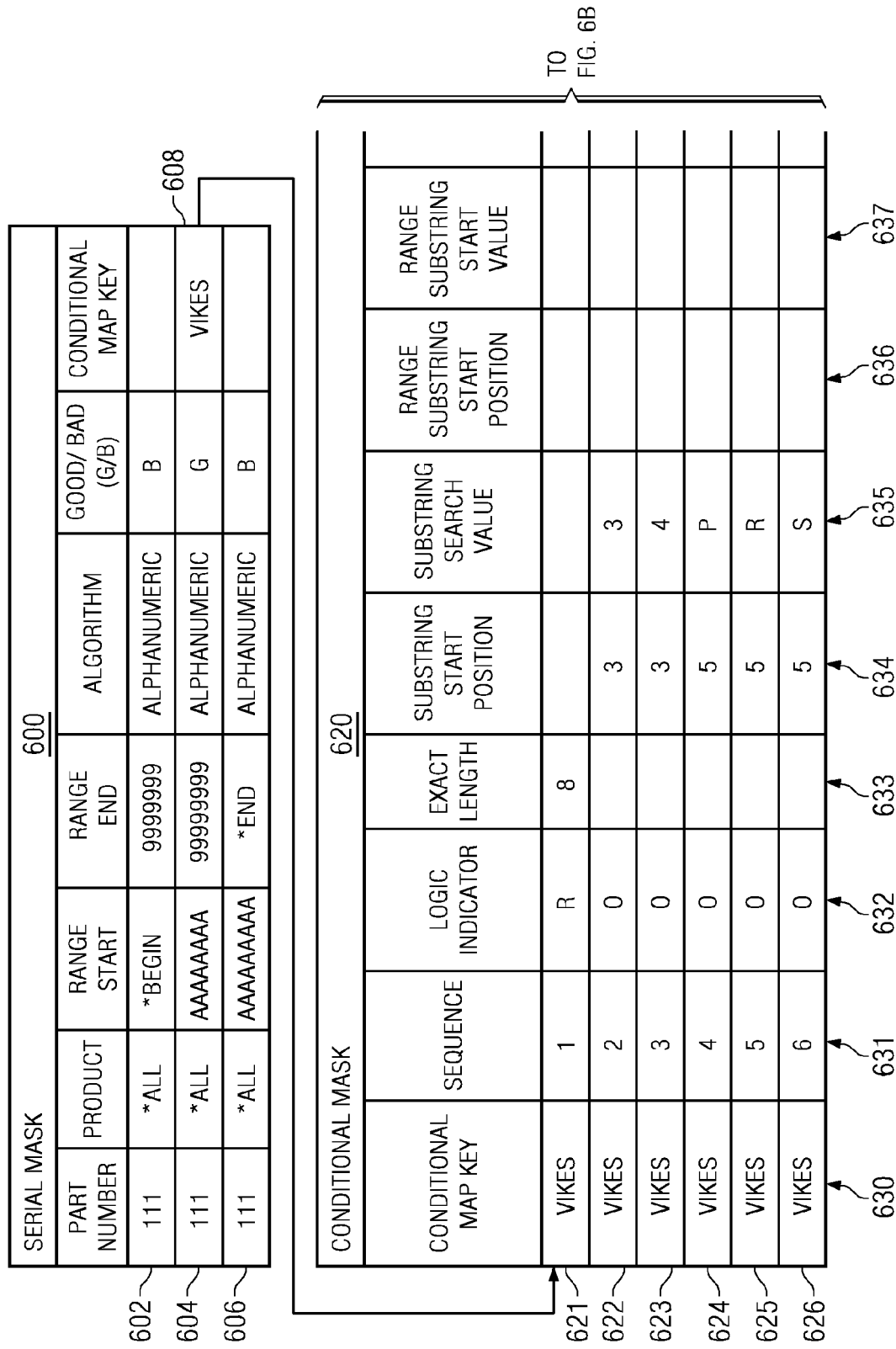

FIGS. 6A and 6B are an example of a conditional mask algorithm process, in which an illustrative embodiment may be implemented. The illustrative example can be found in a data element, such as conditional map key 322 of FIG. 3, and created using a conditional mask algorithm, such as conditional mask algorithm 324 of FIG. 3. The illustrative example includes serial mask table 600 and conditional mask table 620.

Serial mask table 600 is the final flattened serial mask after applying the flattening algorithm to a list of defective products. Serial mask table 600 is similar to table 450 of FIG. 4C. In the illustrative embodiment, the algorithm used to identify the serial numbers in lines 602 through 606 is an alphanumeric number system. Line 602 indicates that "*ALL" products that include part number "111" from the first serial number "*BEGIN" to the serial number ending in 9999999 are identified as defective or "B". Line 604 indicates that "N*ALL" products with part number "111" from serial number "AAAAAAAA" to "99999999" are good or have a product status of "G". Line 606 indicates that "*ALL" products that include the part number "111" from the serial number beginning with AAAAAAAA to the last serial number "*END" are also defective or "B".

Entry 608 indicates that line 604 has a conditional map key named "VIKES". "VIKES" is the name of the conditional mask algorithm that should be applied to the serial numbers in line 604 of table 600. The conditional mask algorithm is a customized algorithm used to narrow and identify defective product. The conditional mask algorithm takes into consideration the variations in serial numbers from business entity to business entity, so that specific identifying features in a serial number can be easily identified.

Conditional mask table 620 is a table for the "VIKES" conditional map key. Conditional mask table 620 is the basis for the conditional mask algorithm that will be applied to the range of serial numbers in line 604 of table 600. Conditional mask table 620 includes lines 621 through 626. Each line 620 through 626 is a separate condition through which the conditional mask algorithm sequentially iterates. Each separate condition is considered a separate conditional mask.

Conditional mask table 620 also includes columns 630 through 646. Conditional map key column 630 identifies to which conditional map key the condition applies. Sequence column 631 identifies the order in which to process each condition. Logic indicator column 632 identifies whether the condition in lines 621 through 626 is required "R" or optional "O". If the logic indicator is "R", then the condition must be applied. Likewise, if the logic indicator is "O", then the condition is optionally applied. Logic indicator column 632 provides Boolean logic capabilities within the conditional mask algorithm. In the illustrative embodiment, line 621 is a required condition, while lines 622 through 626 are optional.

Exact length column 633 identifies the length of the serial number used for the particular product. Thus, in line 621, "8" is the identified length of the serial numbers listed in line 604 of table 610. Substring start position column 634 indicates the position in the serial number string at which applying the condition. Thus, in the illustrative embodiment in line 622, the substring start position is identified as "3", which means that the condition in line 622 applies to the third character in the serial number. Line 623 also identifies a substring start position of "3". Lines 624 through 626 indicate that the substring start position is "5", which means that the conditions in lines 624 through 626 apply to the fifth character in the serial number.

Substring search value column 635 is the value to search for in the position identified in substring start position column 634. Thus, in the illustrative embodiment in line 622, the conditional mask algorithm searches for the value "3" in substring start position "3". Likewise, the conditional mask algorithm searches for the value "4" in substring start position "3" in line 623, for the value "P" in substring start position "5" in line 624, for the value "R" in substring start position "5" in line 625, and for the value "S" in substring start position "5" in line 626.

Range substring start position column 636 is the starting position in a range of serial numbers to begin applying the condition. Range substring start value column 637 and range substring end value column 638 identifies the series of numbers or characters for which to search. Range substring start value column 637 and range substring end value column 638 allow for a range of numbers to be searched for. For example, conditional mask algorithm can search for all serial numbers that begin with "529" and end with "59A" and has a range substring start position of "5". Thus, in this example, the conditional mask algorithm will apply the identified condition to all products with a serial number that is in the range in position "5" beginning with "529" and ending with "59A".

Range lookup list column 639 identifies a table, other than serial mask table 610, to apply the condition to if another table is also used in conjunction with serial mask table 600. Serial algorithm column 640 is similar to the algorithm column in table 600 and algorithm column 406 of FIG. 4A. Serial algorithm column 640 allows for another type of number algorithm to be applied which is different than the one identified in serial mask table 600.

Is alphanumeric column 641 indicates that conditional mask algorithm is to verify that the character in substring start position column 634 is an alphanumeric character. Is numeric column 642 indicates that the character in substring start position column 634 is a numeric number. Good/bad (G/B) column 643 indicates whether the product in lines 621 through 626 is good or defective.

The conditional mask algorithm also allows a user to create or customize a conditional mask. Thus, user exit column 644 identifies a customized conditional mask that is created by the user to be applied to an identified serial mask. In essence, a user can create their own set of instructions for executing the conditional mask, load the name of the set of instructions into user exit column 644, and refer to the loaded name as a conditional mask in the future. A user may use the feature in user exit column 644 if the user would like to identify a series of characters, such as "AAAA", located anywhere within the serial number. In the illustrative embodiment, user exit return column 645 allows for a good and bad status, which is represented as "1" for good and "0" ford.

Sub-conditional map key column 646 identifies the name of another conditional map key to which the condition in lines 621 through 626 refers. In other words, conditional map keys can be nested within each other. Therefore, a conditional map key can refer to another conditional map key, which can then refer to another conditional map key. The number of conditional map keys that can be referred to is infinite. Although, in practice, a maximum of two layers of conditional map keys will probably be used.

Thus, in the illustrative embodiment, conditional mask table 620 indicates that the "VIKES" conditional mask algorithm needs to be applied to any product that includes part number "111" and has a serial number in the range of AAAAAAAA to 99999999 based on an alphanumeric number system. Thus, products with a "G" status have a serial number exactly "8" digits long and have a "3" or "4" in position "3" of the serial number and do not have a "P", "R", or "S" in position "5" of the serial number. All other products listed in serial mask table 600 are considered defective or have a product status of "B".

The illustrative embodiments are not limited to the illustrative example. For example, more or fewer columns and rows can exist in serial mask table 600 and conditional mask table 620. Additionally, more or fewer entries can be included in serial mask table 600 and conditional mask table 620. Moreover, all possible entry locations in serial mask table 600 and conditional mask table 620 can be used or can remain empty.

Figure 7:
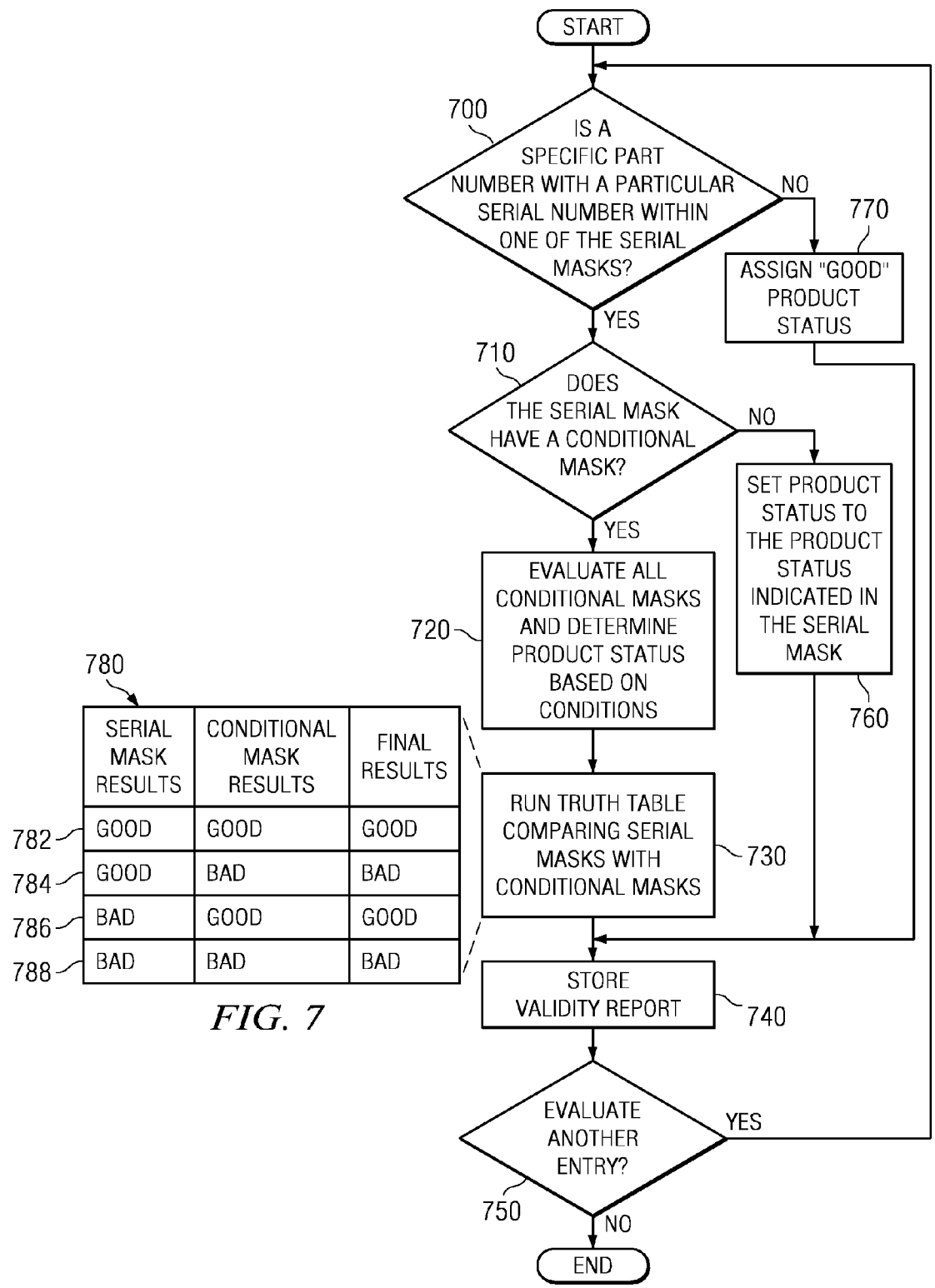
FIG. 7 is a flowchart illustrating a validation process, in which an illustrative embodiment may be implemented.

FIG. 7 is a flowchart illustrating the validation process, in which an illustrative embodiment may be implemented. The illustrated process is executed in a validation engine, similar to validation engine 330 of FIG. 3. The following process is exemplary only and the order of the steps may be interchanged without deviating from the scope of the invention.

The process begins with the validation engine determining whether a product with a specific part number with a particular serial number is included within one of the serial masks (step 700). If the product is within the serial mask ("yes" output to step 700), then the validation engine determines whether the serial mask has a conditional mask (step 710). If the serial mask has a conditional mask ("yes" output to step 710), then the validation engine evaluates all conditional masks and determines the product status of each product based on the conditions (step 720). Then the validation engine process then runs a truth table comparing the serial masks with the conditional masks (step 730). Table 780 illustrates the truth table used by the validation engine. As shown in truth table 780 in lines 782 and 788, if both the serial mask result and the conditional mask result are the same, then the final result is the same. Thus, in line 782, the final result is "good" because both the serial mask and the conditional mask indicate a "good" product status. In line 788, the final result is "bad" because both the serial mask and the conditional mask indicate a "bad" product status. In the illustrative embodiment, when the product status for a product is different after applying the flattening algorithm and the conditional mask algorithm, conditional masks always take precedence over serial masks. Thus, in lines 784 and 786 of truth table 780, the final result always reflects the conditional mask result. In line 784, the final result is "bad" because the conditional mask has a "bad" product status, and in line 786, the final result is "good" because the conditional mask result has a "good" product status.

The validation engine then stores the results in a report (step 740). The validation engine then determines whether another entry needs to be evaluated (step 750). If another entry needs to be evaluated ("yes" output to step 750), then the process repeats and begins again with step 700. If another entry does not need to be evaluated ("no" output to step 750), the process terminates thereafter.

Returning now to step 710, if the validation engine determines that the serial mask does not have a conditional mask ("no" output to step 710), then the validation engine sets the product status to the product status indicated in the serial mask (step 760). The validation engine then stores the results in a report (step 740). The validation engine then determines whether another entry needs to be evaluated (step 750). If another entry needs to be evaluated ("yes" output to step 750), the process repeats and begins again with step 700. If another entry does not need to be evaluated ("no" output to step 750), the process terminates thereafter.

Returning to step 700, if the product is not within the serial mask, then the product is assigned a "good" product status (step 770). The validation engine then stores the results in a report (step 740). The validation engine then determines whether another entry needs to be evaluated (step 750). If another entry needs to be evaluated ("yes" output to step 750), then the process repeats and begins again with step 700. If another entry does not need to be evaluated ("no" output to step 750), the process terminates thereafter.

Figure 8:
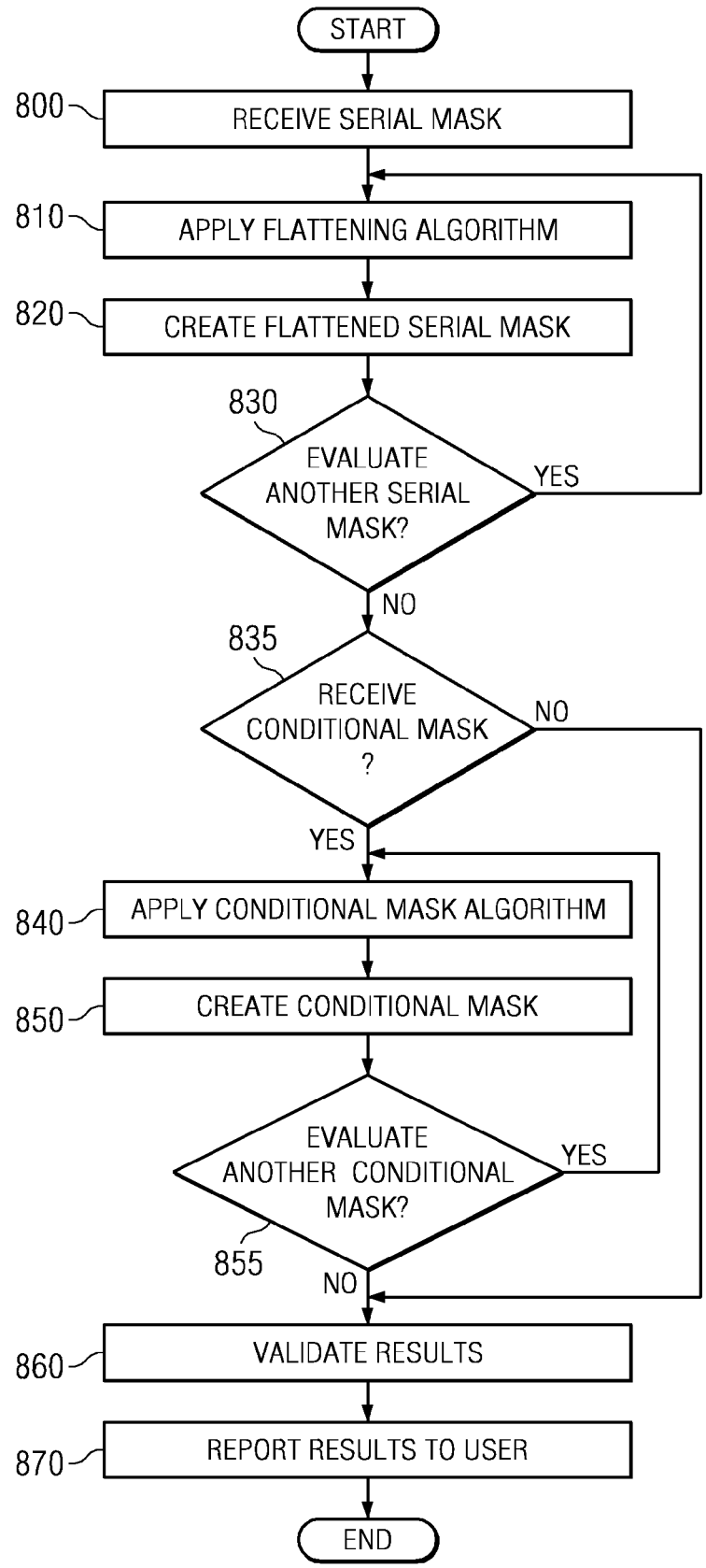
FIG. 8 is a flowchart summarizing a process for identifying a defective product, in which an illustrative embodiment may be implemented.

FIG. 8 is a flowchart summarizing the process for identifying a defective product, in which an illustrative embodiment may be implemented. The process is executed in a defective product identification system, similar to data processing system 300 of FIG. 3. The following process is exemplary only and the order of the steps may be interchanged without deviating from the scope of the invention.

The process begins with the defective product identification system receiving a serial mask (step 800). The defective product identification system then applies the flattening algorithm to the serial mask (step 810). The defective product identification system then creates a flattened serial mask (step 820). The defective product identification system then determines whether another serial mask needs to be evaluated (step 830). If another serial mask needs to be evaluated ("yes" output to step 830), then the process repeats beginning with step 810. If another serial mask does not need to be evaluated ("no" output to step 830), then the defective product identification system determines whether a conditional mask is received (step 835).

If a conditional mask is received ("yes" output to step 835), then the defective product identification system applies the conditional mask algorithm (step 840). The defective product identification system then creates the conditional mask (step 850) and determines whether another conditional mask is to be evaluated (step 855). If another conditional mask is to be evaluated ("yes" output to step 855), then the process repeats beginning with step 840. If another conditional mask is not to be evaluated ("no" output to step 855), then the defective product identification system validates the results (step 860). The results are then reported to the user (step 870), with the process terminating thereafter.

Returning to step 835, if a conditional mask is not received ("no" output to step 835), then the defective product identification system validates the results (step 860). The results are then reported to the user (step 870), with the process terminating thereafter.

In an alternative embodiment, the process of validation in step 860 and the process of reporting results to the user in step 870 can repeat. In other words, the defective product identification system can validate results multiple times and report results to a user multiple times. The implementation of repeating steps 860 and 870 can optionally be determined by the user.

Thus, a computer implemented method, an apparatus, and computer usable program product for identifying a defective product is provided. A data processing system identifies a product status for products comprising at least one range of serial numbers. The data processing system then narrows the at least one range of serial numbers using a range flattening algorithm. The application of the range flattening algorithm forms a serial mask that identifies a narrowed range of serial numbers. The data processing system can also apply a conditional mask algorithm to the at least one range of serial numbers to narrow the at least one range of serial numbers. The application of the conditional mask algorithm forms conditional mask results. The data processing system then validates the serial mask against the conditional mask results. The data processing system then presents a list of good products and a list of defective products to a user.

The flattening algorithm includes three-phases: (1) creating a base range of serial numbers; (2) splitting at least one range of serial numbers; and (3) merging adjacent ranges of serial numbers. In the phase for creating a base range of serial numbers, the flattening algorithm identifies a beginning serial number and an ending serial number. The flattening algorithm then identifies a beginning range of serial numbers. The beginning range of serial numbers begins with the beginning serial number and ends with a serial number immediately preceding a first serial number in the at least one range of serial numbers. The flattening algorithm then identifies an ending range of serial numbers. The ending range of serial numbers begins with a serial number immediately subsequent to the last serial number in the at least one range of serial numbers. The ending range ends with the ending serial number. The flattening algorithm then inverts the product status for products comprising the beginning range of serial numbers and for products comprising the ending range of serial numbers. A product status is an identification of whether the product is good or defective.

In the phase for splitting at least one range of serial numbers, the flattening algorithm first identifies a serial number in the at least one range of serial numbers to form an identified serial number. The flattening algorithm then identifies a preceding range of serial numbers that precedes the identified serial number. The preceding range of serial numbers ends with the serial number immediately preceding the identified serial number. The flattening algorithm then identifies a subsequent range of serial numbers that are subsequent to the identified serial number. The subsequent range of serial numbers begins with the serial number immediately subsequent to the identified serial number. The flattening algorithm then inverts a product status for products comprising the preceding range of serial numbers and a product status for products comprising the subsequent range of serial numbers.

In the phase for merging adjacent ranges of serial numbers, the at least one range of serial numbers is a plurality of ranges of serial numbers. The flattening algorithm scans the plurality of ranges of serial numbers for an adjacent serial number. In response to identifying an adjacent serial number, the flattening algorithm identifies a product status for products comprising the adjacent serial number. In response to the product status for the products comprising the adjacent serial number being the same, the flattening algorithm combines the ranges of serial numbers that comprise the adjacent serial number.

To apply the conditional mask algorithm, the data processing system identifies at least one conditional mask for the defective product. The data processing system then identifies a portion of the serial number to which to begin applying the at least one conditional mask.

In validating the serial mask against the conditional mask results, the conditional mask results always have priority over the serial mask. A validation engine uses a truth table to compare a product status for products included in the serial mask and the conditional mask results. In response to both the serial mask and the conditional mask results reporting a good product status, the validation engine applies the good product status to the products. In response to both the serial mask and the conditional mask results reporting a defective product status, the validation engine applies the defective product status to the products. In response to the serial mask reporting a different product status from the conditional mask results, the validation engine applies the product status from the conditional mask results to the products.

The illustrative embodiments provide a computer implemented method, an apparatus, and a computer usable program product for identifying a defective product. The illustrative embodiments reduce quality containment exposure by reducing warranty costs, reducing manufacturing rework costs, minimizing the impact to customers, and minimizing risks to customer satisfaction. The illustrative embodiments also eliminate errors associated with manual containment methods. Furthermore, the illustrative embodiments provide a containment method which addresses complex conditional use scenarios, thereby enabling automated control for all possible use conditions. The illustrative embodiments also provide an adaptive model that can adapt to any supplier serial number algorithm. As a result, all containment capabilities are normalized and standardized regardless of the serial number algorithm used. In addition, the illustrative embodiments reduce manufacturing time spent on manual part containment activities.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for identifying defective product, the method comprising:
   identifying by a processor, in a data processing system, a product status for products comprising at least one range of serial numbers, wherein the product status identifies each of the products as a good product or a defective product;
   identifying by the processor, a first serial number for a first product, the first product having a first status, wherein the first serial number is within the at least one range of serial numbers;
   responsive to receiving the first serial number, narrowing by the processor, the at least one range of serial numbers using a range flattening algorithm, wherein the step of narrowing the at least one range of serial numbers using the range flattening algorithm comprises creating a base range of serial numbers, splitting by the processor, the at least one range of serial numbers into a plurality of ranges of serial numbers, and merging by the processor, adjacent ranges of serial numbers; wherein the step of creating the base range of serial numbers comprises: identifying a beginning serial number of the at least one range of serial numbers and an ending serial number of the at least one range of serial numbers, identifying a beginning range of serial numbers that begins with the beginning serial number and ends with a serial number immediately preceding the first serial number, identifying an ending range of serial numbers that begins with a serial number immediately subsequent to the first serial number in the at least one range of serial numbers and ends with the ending serial number, and inverting the product status for the beginning range of serial numbers and for the ending range of serial numbers; and applying by the processor, a conditional mask algorithm to the at least one range of serial numbers to narrow the at least one range of serial numbers.

2. The computer implemented method of claim 1, wherein the step of splitting the at least one range of serial numbers into the plurality of ranges of serial numbers comprises:

identifying by the processor, a second serial number in one of the beginning range of serial numbers or the ending range of serial numbers;

identifying by the processor, a preceding range of serial numbers, wherein if the second serial number is identified within the beginning range of serial numbers, the preceding range of serial numbers begins with the beginning serial number and ends with a serial number immediately preceding the second serial number, and wherein if the second serial number is identified within the ending range of serial numbers, the preceding range of serial numbers begins with a serial number immediately subsequent to the first serial number and ends with the serial number immediately preceding the second serial number;

identifying by the processor, a subsequent range of serial numbers, wherein if the second serial number is identified within the beginning range of serial numbers, the subsequent range of serial numbers begins with the serial number immediately subsequent to the second serial number and ends with the serial number immediately preceding the first serial number, and wherein if the second serial number is identified within the ending range of serial numbers, the subsequent range of serial numbers begins with a serial number immediately subsequent to the second serial number and ends with the serial number immediately preceding the ending serial number; and inverting by the processor, a product status for products comprising the preceding range of serial numbers and a product status for products comprising the subsequent range of serial numbers.

3. The computer implemented method of claim 1, wherein the at least one range of serial numbers is the plurality of ranges of serial numbers, and wherein the step of merging the adjacent ranges of serial numbers comprises:

scanning by the processor, the plurality of ranges of serial numbers for an adjacent serial number;

responsive to identifying the adjacent serial number, identifying by the processor, the product status for the products comprising the adjacent serial number; and responsive to the product status for the products comprising the adjacent serial number being the same, combining by the processor, ranges of serial numbers that comprise the adjacent serial number.

4. The computer implemented method of claim 1, wherein the step of applying the conditional mask algorithm to the at least one range of serial numbers to narrow the at least one range of serial numbers comprises:

identifying by the processor, at least one conditional mask for the defective product; and identifying by the processor, a portion of the serial number to which to apply the at least one conditional mask.

5. The computer implemented method of claim 1, further comprising:

responsive to narrowing the at least one range of serial numbers using the range flattening algorithm, forming a serial mask that identifies a narrowed range of serial numbers;

responsive to applying the conditional mask algorithm, forming by the processor, conditional mask results;

validating by the processor, the serial mask against the conditional mask results; and presenting by the processor, a list of good products and a list of defective products to a user.

6. The computer implemented method of claim 5, wherein the step of validating the serial mask against the conditional mask results comprises:

forming by the processor, a truth table that compares a product status for products included in the serial mask and the conditional mask results;

responsive to both the serial mask and the conditional mask results reporting a good product status, applying by the processor the good product status to the products;

responsive to both the serial mask and the conditional mask results reporting a bad product status, applying by the processor the bad product status to the products; and responsive to the serial mask reporting a different product status from the conditional mask results, applying by the processor the product status from the conditional mask results to the products.

7. A data processing system comprising:

a storage having computer usable code encoded thereon;

a bus system connecting the storage to a processor; and a processor, wherein the processor executes the computer usable code to identify a product status for products comprising at least one range of serial numbers, wherein the product status identifies each of the products as a good product or a defective product; to identify a first serial number for a first product, the first product having a first status, wherein the first serial number is within the at least one range of serial numbers; responsive to receiving the first serial number, to narrow the at least one range of serial numbers using a range flattening algorithm, wherein the step of narrowing the at least one range of serial numbers using the range flattening algorithm comprises creating a base range of serial numbers, splitting by the processor, the at least one range of serial numbers into a plurality of ranges of serial numbers, and merging by the processor, adjacent ranges of serial numbers; wherein the step of creating the base range of serial numbers comprises: identifying a beginning serial number of the at least one range of serial numbers and an ending serial number of the at least one range of serial numbers, identifying a beginning range of serial numbers that begins with the beginning serial number and ends with a serial number immediately preceding the first serial number, identifying an ending range of serial numbers that begins with a serial number immediately subsequent to the first serial number in the at least one range of serial numbers and ends with the ending serial number, and inverting the product status for the beginning range of serial numbers and for the ending range of serial numbers; and to apply a conditional mask algorithm to the at least one range of serial numbers to narrow the at least one range of serial numbers.

8. The data processing system of claim 7, wherein the processor further executes the computer usable code:
to create the base range of serial numbers; to split the at least one range of serial numbers into a plurality of ranges of serial numbers; and to merge adjacent ranges of serial numbers, wherein the computer usable code for splitting the at least one range of serial numbers into the plurality of ranges of serial numbers comprises the computer usable code;
to identify a second serial number in one of the beginning range of serial numbers or the ending range of serial numbers;
to identify a preceding range of serial numbers, wherein if the second serial number is identified within the beginning range of serial numbers, the preceding range of serial numbers begins with the beginning serial number and ends with a serial number immediately preceding the second serial number, and wherein if the second serial number is identified within the ending range of serial numbers, the preceding range of serial numbers begins with a serial number immediately subsequent to the first serial number and ends with the serial number immediately preceding the second serial number;
to identify a subsequent range of serial numbers wherein if the second serial number is identified within the beginning range of serial numbers, the subsequent range of serial numbers begins with the serial number immediately subsequent to the second serial number and ends with the serial number immediately preceding the first serial number, and wherein if the second serial number is identified within the ending range of serial numbers, the subsequent range of serial numbers begins with a serial number immediately subsequent to the second serial number and ends with the serial number immediately preceding the ending serial number; and
to invert a product status for products comprising the preceding range of serial numbers and a product status for products comprising the subsequent range of serial numbers.

9. A tangible computer storage medium having computer usable program code encoded thereon for identifying a defective product, the computer usable program code comprising:
computer usable program code for identifying, in a data processing system, a product status for products comprising at least one range of serial numbers, wherein the product status identifies each of the products as a good product or a defective product;
computer usable program code for identifying a first serial number for a first product, the first product having a first status, wherein the first serial number is within the at least one range of serial numbers;
computer usable program code, responsive to receiving the first serial number, for narrowing the at least one range of serial numbers using a range flattening algorithm, wherein the step of narrowing the at least one range of serial numbers using the range flattening algorithm comprises creating a base range of serial numbers, splitting by the processor, the at least one range of serial numbers into a plurality of ranges of serial numbers, and merging by the processor, adjacent ranges of serial numbers, wherein the step of creating the base range of serial numbers comprises, identifying a beginning serial number of the at least one range of serial numbers and an ending serial number of the at least one range of serial numbers, identifying a beginning range of serial numbers that begins with the beginning serial number and ends with a serial number immediately preceding the first serial number, identifying an ending range of serial numbers that begins with a serial number immediately subsequent to the first serial number in the at least one range of serial numbers and ends with the ending serial number, and inverting the product status for the beginning range of serial numbers and for the ending range of serial numbers; and
computer usable program code for applying a conditional mask algorithm to the at least one range of serial numbers to narrow the at least one range of serial numbers.

10. The tangible computer storage medium of claim 9, wherein the computer usable program code for splitting the at least one range of serial numbers into the plurality of ranges of serial numbers comprises:
computer usable program code for identifying a second serial number in one of the beginning range of serial numbers or the ending range of serial numbers;
computer usable program code for identifying a preceding range of serial numbers, wherein if the second serial number is identified within the beginning range of serial numbers, the preceding range of serial numbers begins with the beginning serial number and ends with a serial number immediately preceding the second serial number, and wherein if the second serial number is identified within the ending range of serial numbers, the preceding range of serial numbers begins with a serial number immediately subsequent to the first serial number and ends with the serial number immediately preceding the second serial number;
computer usable program code for identifying a subsequent range of serial numbers, wherein if the second serial number is identified within the beginning range of serial numbers, the subsequent range of serial numbers begins with the serial number immediately subsequent to the second serial number and ends with the serial number immediately preceding the first serial number, and wherein if the second serial number is identified within the ending range of serial numbers, the subsequent range of serial numbers begins with a serial number immediately subsequent to the second serial number and ends with the serial number immediately preceding the ending serial number; and
computer usable program code for inverting a product status for products comprising the preceding range of serial numbers and a product status for products comprising the subsequent range of serial numbers.

11. The tangible computer storage medium of claim 9, wherein the at least one range of serial numbers is a plurality of ranges of serial numbers, wherein the computer usable program code for merging adjacent ranges of serial numbers comprises:
computer usable program code for scanning the plurality of ranges of serial numbers for an adjacent serial number;
responsive to identifying the adjacent serial number, computer usable program code for identifying a product status for products comprising the adjacent serial number; and
responsive to the product status for the products comprising the adjacent serial number being the same, computer usable program code for combining ranges of serial numbers that comprise the adjacent serial number.

12. The tangible computer storage medium of claim 9, wherein the computer usable program code for applying the conditional mask algorithm to the at least one range of serial numbers to narrow the at least one range of serial numbers comprises:

computer usable program code for identifying at least one conditional mask for the defective product; and computer usable program code for identifying a portion of the serial number to apply the at least one conditional mask.

13. The tangible computer storage medium of claim 9, further comprising:

responsive to narrowing the at least one range of serial numbers using the range flattening algorithm, computer usable program code for forming a serial mask that identifies a narrowed range of serial numbers;

responsive to applying the conditional mask algorithm, computer usable program code for forming conditional mask results;

computer usable program code for validating the serial mask against the conditional mask results; and computer usable program code for presenting a list of good products and a list of defective products to a user.

14. The tangible computer storage medium of claim 13, wherein the computer usable program code for validating the serial mask against the conditional mask results comprises:

computer usable program code for forming a truth table that compares a product status for products included in the serial mask and the conditional mask results;

responsive to both the serial mask and the conditional mask results reporting a good product status, computer usable program code for applying the good product status to the products;

responsive to both the serial mask and the conditional mask results reporting a bad product status, computer usable program code for applying the bad product status to the products; and responsive to the serial mask reporting a different product status from the conditional mask results, computer usable program code for applying the product status from the conditional mask results to the products.

\* \* \* \* \*